United States Patent
Deluca

(10) Patent No.: US 9,035,891 B2
(45) Date of Patent: May 19, 2015

(54) MULTI-POINT TOUCH-SENSITIVE SENSOR USER INTERFACE USING DISTINCT DIGIT IDENTIFICATION

(75) Inventor: Lisa Seacat Deluca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/425,244

(22) Filed: Mar. 20, 2012

(65) Prior Publication Data

US 2012/0188189 A1     Jul. 26, 2012

Related U.S. Application Data

(63) Continuation-in-part of application No. 12/122,305, filed on May 16, 2008.

(51) Int. Cl.
   *G06F 3/041*     (2006.01)
   *G06F 3/0488*     (2013.01)

(52) U.S. Cl.
   CPC ............ *G06F 3/041* (2013.01); *G06F 3/04883* (2013.01); *G06F 2203/04104* (2013.01); *H04M 2250/22* (2013.01)

(58) Field of Classification Search
   CPC ... G06F 3/0235; G06F 21/32; G06K 9/00375; G07C 9/00158
   USPC ................................. 345/173–179; 708/200; 178/18.01–18.04
   See application file for complete search history.

(56) References Cited

U.S. PATENT DOCUMENTS

| | | |
|---|---|---|
| 4,180,713 A | 12/1979 | Gonzales |
| 6,246,395 B1 | 6/2001 | Goyins et al. |
| 6,323,846 B1 * | 11/2001 | Westerman et al. .......... 345/173 |
| 6,350,037 B1 | 2/2002 | Adams |
| 6,654,484 B2 | 11/2003 | Topping |
| 7,129,431 B2 | 10/2006 | Ichimura et al. |
| 7,663,607 B2 | 2/2010 | Hotelling et al. |
| 2002/0085043 A1 | 7/2002 | Ribak |
| 2004/0037016 A1 | 2/2004 | Kaneko et al. |
| 2004/0138795 A1 | 7/2004 | Alkarawi et al. |
| 2005/0052427 A1 | 3/2005 | Wu et al. |
| 2005/0073195 A1 | 4/2005 | Popilek |
| 2005/0167252 A1 | 8/2005 | Inoue et al. |
| 2006/0097991 A1 | 5/2006 | Hotelling et al. |

(Continued)

FOREIGN PATENT DOCUMENTS

EP     2000894 A2     12/2008

OTHER PUBLICATIONS

Han, "Multi-Touch Interaction Research", http://cs.nyu.edu/~jhan/ftirtouch/, 2006.
U.S. Appl. No. 12/122,305, Office Action Summary, Mar. 31, 2011.
U.S. Appl. No. 12/122,305, Office Action Summary, Oct. 11, 2011.

(Continued)

*Primary Examiner* — Kimnhung Nguyen
(74) *Attorney, Agent, or Firm* — Kunzler Law Group

(57) ABSTRACT

For digit identification on a multi-point touch sensitive sensor, an assignment module assigns a digit identity to each digit of at least two digits in contact with a multi-point touch sensitive sensor during a learning phase. The digit identity includes a distinct representation of each digit. A receiving module detects a digit interaction of one or more particular digits of the at least two digits with the multi-point touch-sensitive sensor. A determination module recognizes the assigned digit identity for each particular digit involved in the digit interaction.

20 Claims, 6 Drawing Sheets

(56) References Cited

U.S. PATENT DOCUMENTS

| | | |
|---|---|---|
| 2006/0224645 A1* | 10/2006 | Kadi ............................ 708/200 |
| 2007/0100523 A1 | 5/2007 | Trachte |
| 2007/0139395 A1 | 6/2007 | Westerman et al. |
| 2007/0262964 A1 | 11/2007 | Zotov et al. |
| 2009/0109180 A1 | 4/2009 | Do et al. |
| 2009/0243998 A1 | 10/2009 | Wang |
| 2009/0284480 A1 | 11/2009 | Seacat |

OTHER PUBLICATIONS

U.S. Appl. No. 12/122,305, Office Action Summary, May 3, 2012.
U.S. Appl. No. 12/122,305, Office Action Summary, Sep. 19, 2012.
U.S. Appl. No. 12/122,305, Final Office Action, Jan. 22, 2013.
U.S. Appl. No. 12/122,305, Office Action, Apr. 17, 2013.
U.S. Appl. No. 12/122,305, Office Action, dated Jan. 15, 2014.
U.S. Appl. No. 12/122,305, Office Action, Oct. 17, 2013.
U.S. Appl. No. 12/122,305, Office Action, dated Apr. 29, 2014.
U.S. Appl. No. 12/122,305, Office Action, dated Sep. 3, 2014.

* cited by examiner

MULTI-POINT TOUCH-SENSITIVE SENSOR USER INTERFACE USING DISTINCT DIGIT IDENTIFICATION

CROSS-REFERENCE TO RELATED APPLICATIONS

This is a continuation-in-part application of and claims priority to patent application Ser. No. 12/122,305 entitled "System and Apparatus for a Multi-Point Touch-Sensitive Sensor User Interface Using Distinct Digit Identification" and filed on May 16, 2008 for Lisa A. Seacat, which is incorporated herein by reference.

BACKGROUND

1. Field

The invention relates to multi-point touch-sensitive sensors. Particularly, the invention relates to a multi-point touch-sensitive sensor user interface using distinct digit identification.

2. Description of the Related Art

As electronic devices have proliferated, the number of ways to interact with those devices has also proliferated. One such user interaction tool, or user interface, is a touch sensitive sensor which can detect touches on its surface. Many such sensors are used in connection with a display or screen allowing a user to interact with onscreen menus or data. These touchscreens are often standard features on such devices as cellphones, Personal Digital Assistants ("PDA"s), and tablet computers.

While many touch sensitive devices are able to sense only one point of contact, multi-point touch-sensitive sensors can detect multiple, simultaneous touches. By allowing more than one contact with the sensor, the user is able to exert greater control and better accuracy over the interface of the device

BRIEF SUMMARY

An apparatus for digit identification on a multi-point touch sensitive sensor is presented. In one embodiment, the apparatus includes a computer readable storage medium storing computer readable program code executable by a processor, an assignment module, a receiving module, and a determination module. In one embodiment, the assignment module assigns a digit identity to each digit of at least two digits in contact with a multi-point touch sensitive sensor during a learning phase. In a further embodiment, the digit identity includes a distinct representation of each digit. In one embodiment, the receiving module detects a digit interaction of one or more particular digits of the at least two digits with the multi-point touch-sensitive sensor. In one embodiment, the determination module recognizes the assigned digit identity for each particular digit involved in the digit interaction. A method and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodi- ments will be described and explained with additional specificity and detail through the use of the accompanying drawings, in which.

DETAILED DESCRIPTION OF THE INVENTION

Figure 1A:
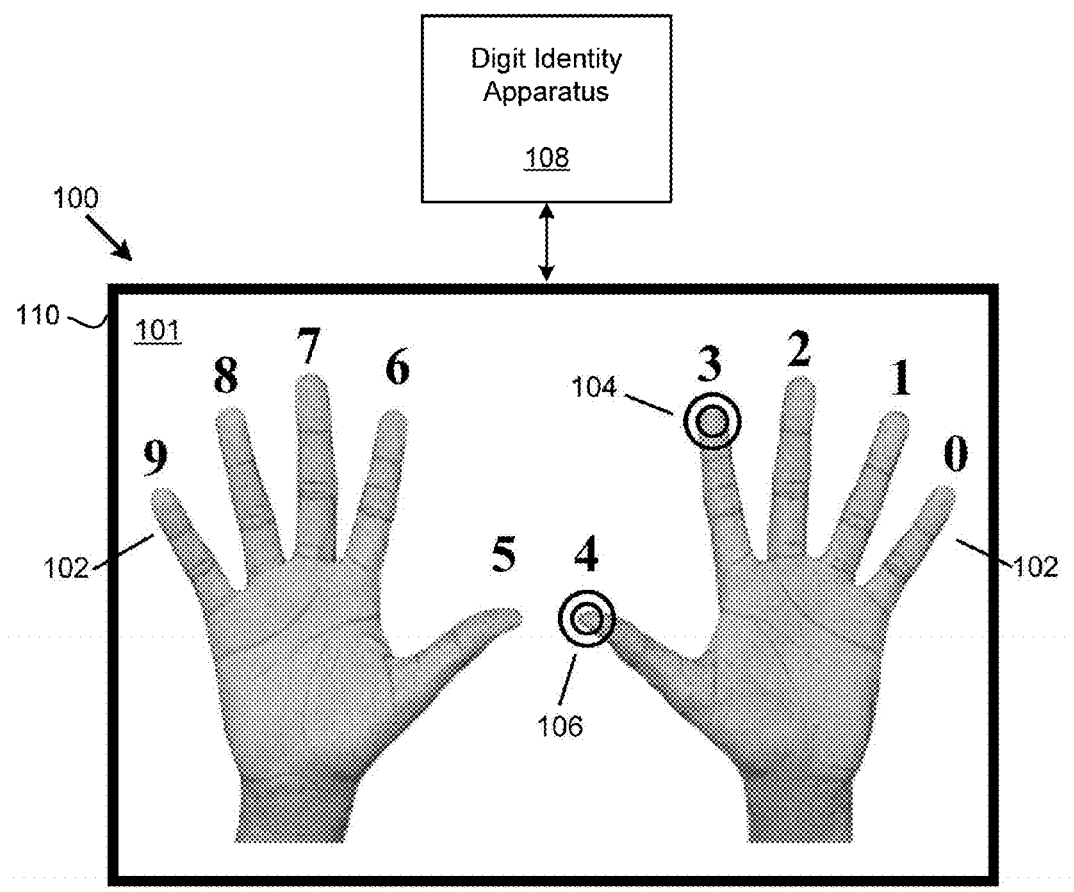
FIG. 1A illustrates one embodiment of a system for a multi-point touch-sensitive sensor user interface using distinct digit identification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 illustrates one embodiment of a system 100 for a multi-point touch-sensitive user interface using distinct digit identification. The system 100 includes a digit identity apparatus 108 in communication with a display 110 and a multi-point touch sensitive sensor 101. Although in the depicted embodiment, the sensor 101 is embedded in the display 110, in other embodiments, the sensor 101 may be separate from the display 110. The sensor 101, in one embodiment, is responsive to a touch and/or a movement. The sensor 101 may also be receptive to multiple contact points (e.g. locations in which objects have made contact with the sensor 101). For example, in one embodiment, the sensor 101 is receptive to a user making contact with the sensor 101 at multiple points on the sensor 101 and is capable of identifying such multiple contact points. The sensor 101 may comprise a capacitive touch sensor, a resistive touch sensor, a surface acoustic wave sensor, an acoustic pulse sensor, an infrared touch sensor, an optical touch sensor, a dispersion signal touch sensor, and the like, and may be embodied as a touchpad, a touchscreen, or the like.

Figure 1B:
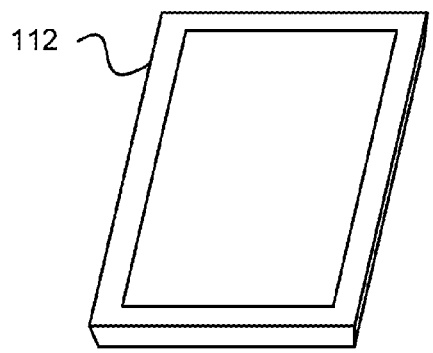
FIG. 1B illustrates embodiments of devices for the multi-point touch sensitive sensor.
Figure 1B:
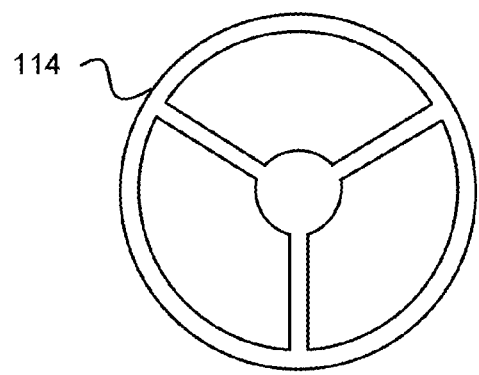
Figure 1B:
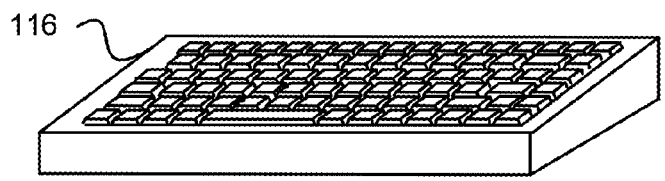
Figure 1B:
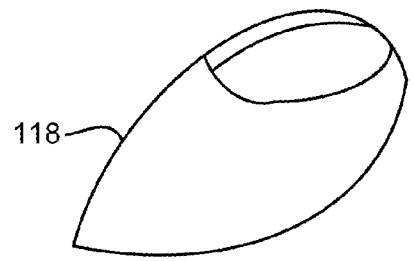

The sensor 101 may be flat such as that used in computer displays, or form fitted as needed. Furthermore, the embedded sensor 101 may be similar to the multi-point touch-sensitive sensors available from Perceptive Pixel, Inc, of New York, N.Y. Referring also to FIG. 1B, in one embodiment, the display 110 and the sensor 101 are embodied in a tablet, slate, or pad computer 112, a personal desktop assistant ("PDA"), an e-Book reader, a mobile phone, a Smartphone, and the like. Although in the embodiment depicted in FIG. 1A, the sensor 101 is embedded in the display 110, in other embodiments, the sensor 101 may be integrated with any suitable device including but not limited to a steering wheel 114, a keyboard 116, a computer mouse 118, a video game control, a portable device display, an automobile, and an electric appliance interface.

The display 110 may be embodied as a Liquid Crystal Display ("LCD") screen, a plasma screen, a projector projecting an image, and the like. In one embodiment, the display 110 is a touchscreen display receiving touch input from a user on a display surface. The display 110, in one embodiment, communicates with and/or is controlled by a computing device.

Referring back to FIG. 1A, the digit identity apparatus 108 may provide and/or be integrated with a user interface that assigns digit identities to digits in contact with the sensor 101, detects a digit interaction involving those digits, and recognizes the assigned digit identities for the digits involved in the digit interaction. In certain embodiments, the digit identity apparatus 108 initiates one or more functions in response to recognizing the assigned digit identities.

In the depicted embodiment, the digit identity apparatus 108 assigns a user's fingers 102 distinct digit identities "0-9". Fingers with the digit identity "3" 104 and "4" 106 have made contact with the sensor 101. Furthermore, in addition to fingers, the digits 102 used for the sensor 101 may include but not be limited to knuckles, toes, a nose, an ear, a tongue, arms, legs, elbows, knees and a head. Furthermore, in certain embodiments, the digit may also be any object capable of being uniquely identified such as a pen, pencil, presentation pointer, and so forth.

In one embodiment, the digit identity apparatus 108 assigns a digit identity to two or more digits based on characteristics of the digits and/or by the relationship between the digits 102. This relationship may be determined by the association between the digits 102 as registered by the multi-point touch-sensitive sensor 101 during an initialization or a learning phase. The association may be based on the spatial position of one digit 104 in relation to another 106 on the sensor 101 surface, as digit "3" 104 is positioned in relation to digit "4" 106. Therefore, when digit "3" 104 and digit "4" 106 are in contact with the sensor 101 simultaneously, based on their position, the digit identity apparatus 108 determines that one finger 104 corresponds with digit identity "3" and the other finger 106 corresponds to digit identity "4." The digit identity apparatus 108 may then use these digit identities to determine functions to initiate. For example, digit "3" 104 may be pre-assigned to carry out a certain function such as launch an email application whenever digit "3" 104 makes contact with the sensor 101.

Figure 2:
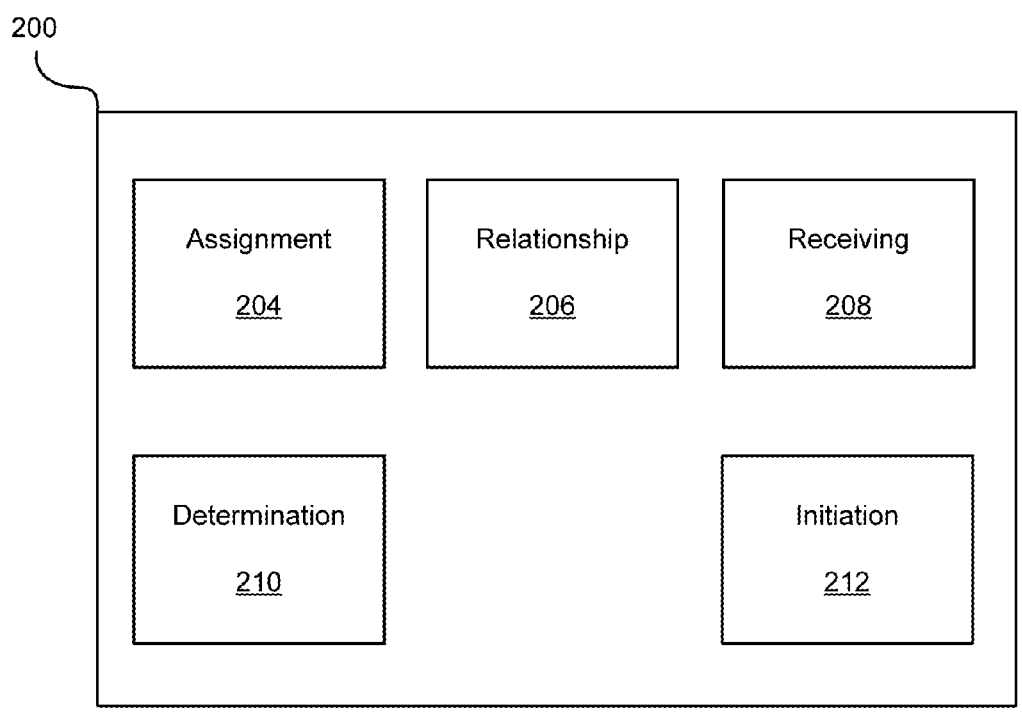
FIG. 2 is a schematic block diagram illustrating one embodiment of an apparatus for a multi-point touch-sensitive sensor user interface using distinct digit identification.

FIG. 2 illustrates one embodiment of an apparatus 200 for a multi-point touch-sensitive sensor user interface using distinct digit identification that includes an assignment module 204, a relationship module 206, a receiving module 208, a determination module 210, and an initiation module 212. The apparatus 200 may comprise one embodiment of the digit identity apparatus 108 depicted in FIG. 1.

The assignment module 204, in one embodiment, assigns digit identities to digits in contact with the sensor 101. In one embodiment, the assignment module 204 assigns a digit identity to each digit of at least two digits in contact with the sensor 101. In one embodiment, the assignment module 204 assigns the digit identities during a learning phase or user interface initialization. This initialization or learning phase may include configuring the sensor 101 by assigning initial digit identities. A digit identity may include a distinct representation of a digit. The assignment module 204 may assign a distinct digit identity to each digit 102. For example, a user who has placed his/her hands on the sensor 101 may have each of his/her fingers 102 assigned a distinct digit identity. This digit identity may be represented as a number, an alphanumeric character, a combination of numbers and characters, a variable, or any other distinct representation. Specifically, in one embodiment, each digit is assigned an alphanumeric value. The digit identity may uniquely identify the digit 102 whenever the digit 102 makes contact with the sensor 101 as described below.

In one embodiment, the assignment module 204 assigns a digit identity based on unique characteristics of the digit 102. The assignment module 204 may assign a digit identity based on an amount of pressure applied by the digit 102, as different digits 102 may apply varying amounts of pressure. For example, a thumb 106 would apply a different amount of pressure than an index finger 104. Consequently, the assignment module 204 may assign a distinct digit identity to the thumb 106 corresponding to the particular amount of pressure the thumb 106 applies with similar terms of assignment for the index finger 104. As a result, whenever the digit 106 makes contact with the sensor 101 applying the amount of pressure corresponding to a thumb 106, the apparatus 200 may recognize the distinct digit identity of the thumb 106. In one embodiment, the assignment module 204 assigns a digit identity based on a contact area of the digit such as a portion, position, and/or location of the contact point of the digit on the sensor 101.

In one embodiment, the assignment module 204 assigns a digit identity for a particular digit based on a number of digit contact points on one or more sides of the particular digit. Specifically, the number of contact points to the right and left of a given contact point can be used to determine which digit made contact. If there is a single contact point to the left of a digit contact point and three contact points to the right then the apparatus 200 may determine that the digit being pressed is the second digit from the left. Furthermore, the size and/or shape of a digit contact point may also be used. A thumb 106 has a different contact size and shape than an index finger 104. Furthermore, a nose has a different contact size and shape than an elbow. If fingers are used as the digits and if the sensor 101 is configured to scan a fingerprint, the fingerprint of the fingers may be used to uniquely identify the digit. In one embodiment, the assignment module 204 assigns a digit identity for each digit by an interaction between two or more digits. The interaction may include comparative movement between the two or more digits (e.g. a movement pattern of a thumb in comparison with a forefinger), comparative pressure between two or more digits (e.g. a relative pressure of one digit compared to another), spacing between the two or more digits, and/or the like. In one embodiment, the assignment module 204 assigns a digit identity based on a plurality of digit characteristics such as two or more of the characteristics described above (e.g. pressure of a digit, size of a digit, and the like).

In one embodiment, the assignment module 204 works with and/or coordinates with a relationship module 206 to assign digit identities. Specifically, in one embodiment, the relationship module 206 determines a relationship between at least two digits 102 based on an association between the digits 102 as registered by and signaled from the sensor 101. As mentioned above, the association may be based on distance between digits and/or the spatial position of one digit 104 in relation to another digit 106 on the sensor 101. In addition, the association may be based on the area of the sensor 101 in which the digit 102 has made contact. For example, a user may initialize the user interface by placing a thumb 106 and index finger 104 on the sensor 101 surface. The relationship module 206 determines that two distinct digits have been registered by the sensor 101 by associating the two digits with their approximate location on the sensor 101 and to each other. In one embodiment, the assignment module 204 assigns the digit identities based on the relationship determined by the relationship module 206. In certain embodiments, the assignment module 204 assigns a distinct digit identity to each digit 102 recognized by the relationship module 206.

In one embodiment, the assignment module 204 stores each digit identity along with characteristics associated with each digit identity such that the determination module 210, as described below, may recognize the assigned digit identities. The assignment module 204 may store the assigned digit identities in a database, a flat file, and/or the like on volatile or non-volatile storage of a computing system in communication with the apparatus 200 and/or sensor 101.

The receiving module 208, in one embodiment, detects digit interactions with the sensor 101. In one embodiment, the receiving module 208 detects a digit interaction of one or more digits that have been assigned digit identities. A digit interaction may be an interaction of one or more digits with the sensor 101. This interaction may include contact and/or movement of one or more digits on the sensor 101 surface and may be in the form of one or more movements by the digit 102 or one or more contacts from the digit 102. For example, a digit interaction may be a simple press of two fingers 102 on the sensor 101. Conversely, the digit interaction may be a finger 104 swiping across the sensor 101 surface. Any other combination of contact or movements from one or more digits 102 may be used as digit interactions. In one embodiment, the receiving module 208 detects a predetermined pattern of a plurality of digit interactions, each with one or more particular digits. For example, the receiving module 208 may detect digit 1 making contact with the sensor 101, then digit 2 making contact with the sensor 101, then digit 1 making contact with the sensor 101.

One or more digit interactions may comprise a digit event that is received and/or accessed by the receiving module 208 from the sensor 101. For example, in one embodiment, the receiving module 208 interfaces with an Application Programming Interface ("API") provided by driver software for a sensor 101 to obtain location coordinates (x and y axis coordinates) and other characteristics for digit events. In one embodiment, the receiving module 208 includes a driver that receives low level signals from the sensor 101 that the receiving module 208 translates into characteristics of digit events and digit interactions. For example, the receiving module 208 may generate an interrupt when the sensor 101 is touched and determine characteristics of the touch in response to the interrupt.

In one embodiment, the receiving module 208, detects digit interactions with the sensor 101 in a period of time subsequent to the learning phase. For example, the assignment module 204 may assign digit identities during the learning phase and the receiving module 208 may detect digit interactions after the learning phase is complete and after digits have been assigned digit identities.

The determination module 210, in one embodiment, recognizes digit identities for digits involved in the digit interaction. After the receiving module 208 receives and/or accesses the digit interaction and/or the digit event, the determination module 210 may recognize a digit identity for each digit 102 involved in the digit event/digit interaction. For example, if a user drags an index finger 104, which has previously been assigned a digit identity of "3", and a thumb 106, which has previously been assigned a digit identity of "4", across a sensor 101, the determination module 210 may determine that digits "3" and "4" have been dragged across the sensor 101.

In one embodiment, the determination module 210 recognizes the assigned digit identities based on similar characteristics of the digits as those used above by the assignment module 204 to assign the digit identities. In certain embodiments, the determination module 210 recognizes a digit identity based on at least one of an amount of pressure applied by the digit, the number of digit contact points on one or more sides of a digit (e.g. to the right and left of a given contact point for a digit), the size and shape of a contact point for a digit, a contact area of the digit, a fingerprint of a digit, and/or the like.

For example, the assignment module 204 may have assigned a particular digit associated with a particular pressure reading with a digit identity of "1." The determination module 210 may recognize a digit with the particular pressure reading as having a digit identity of 1. In one embodiment, the determination module 210 recognizes the assigned digit identity for a digit by a relative position of a digit contact point in relation to other digit contact points, a spatial relationship between digits, and/or a distance between digits. As described above, if there is a single contact point to the left of a digit contact point and three contact points to the right then the determination module 210 may recognize that the digit being pressed is the second digit from the left. In one embodiment, the determination module 210 recognizes a digit identity based on plurality of digit characteristics such as two or more of the characteristics described above (e.g. pressure of a digit, size of a digit, and the like).

In one embodiment, the determination module 210 recognizes the assigned digit identity for each digit by an interaction between two or more digits. In a further embodiment, this interaction corresponds to an interaction used by the assignment module 204 to initially assign the digit identities of the two or more digits. In one embodiment, the determination module 210 recognizes a predetermined pattern of a plurality of digit interactions, each with one or more particular digits. For example, a predetermined pattern may include digit 1 making contact with the sensor 101, then digit 2, then digit 1 and the determination module 210 may recognize this predetermined pattern in response to digit 1 making contact with the sensor 101, then digit 2 making contact with the sensor 101, then digit 1 making contact with the sensor 101.

In one embodiment, the determination module 210 references characteristics for particular assigned digit identities stored by the assignment module 204 and compares characteristics for digits involved in the digit interaction with these stored characteristics. For example, in one embodiment, the determination module 210 compares an amount of pressure applied by a particular digit with amounts of pressure for various assigned digit identities stored by the assignment module 204 and recognizes the digit identity for the particular digit in response to determining that the amount of pressure associated with the digit identity corresponds to the amount of pressure for the particular digit.

The initiation module 212, in one embodiment, initiates a function (a digit event function) in response to the determination module 210 recognizing the assigned digit identity. In one embodiment, the initiation module 212 may initiate the digit event function associated with the determined digit identity and the digit interaction. The digit event function may be assigned to a specific digit identity regardless of the form of the digit interaction. For instance, the digit 104 with the identity of "3" may be assigned the digit event to open an internet browser window on a tablet computer display regardless of whether digit "3" makes brief contact with the sensor 101, drags across the sensor 101, or presses and remains on the sensor 101 surface. In one embodiment, the initiation module 212 initiates a function in response to a combination of an assigned digit identity and a characteristic of the digit interaction. A characteristic of the digit interaction may include a movement of the digit across the sensor 101, a length of time the digit made contact with the sensor 101, and/or the like. For example, digit "3" may be assigned to open an internet browser window if digit "3" makes a brief contact with the sensor 101, while a sweep across the sensor 101 surface with digit "3" may cause the browser window to scroll. The user may predefine what digit event functions are implemented with certain digit identities and digit interactions. In one embodiment, the initiation module 212 initiates a function in response to a combination of each recognized assigned digit identity. For example, the initiation module 212 may initiate a first function in response to a digit interaction with digit 1, but initiate a second distinct function in response to a digit interaction with digits 1 and 2.

In one embodiment, the initiation module 212 initiates a function in response to a combination of each recognized assigned digit identity and a characteristic of the digit interaction. For example, the initiation module 212 may initiate a first function in response to digits 1 and 2 sweeping across the sensor 101, but initiate a second distinct function in response to digits 1 and 2 resting on the sensor 101.

In one embodiment, the initiation module 212 initiates a function in response to a pattern of digit identities in one or more digit interactions. Specifically, in one embodiment, the initiation module 212 initiates a function in response to the determination module 210 recognizing a predetermined pattern of a plurality of digit interactions, each with one or more particular digits. For example, the initiation module 212 may initiate a function in response to digit 1 making contact with the sensor 101, then digit 2, then digit 1.

Digit event functions may vary depending on the implementation of the sensor 101. For example, possible digit event functions for an automobile steering wheel with an integrated multi-point touch-sensitive sensor 101 may include changing a radio station, changing the compact disc ("CD") playing in the multi-disk player, changing the track on the CD, dialing a phone number with an attached Bluetooth phone, doing math on a calculator, changing the volume, changing the temperature, or picking pre-set information such as radio stations. If each of a user's fingers 102 has been assigned the digit identity "0-9", a user could easily perform math functions having every number combination possible from his fingers 102. For example a user might press digit "3" which is assigned number 3 and then digit "4" which is assigned number 4. Both 3 and 4 are added together and a result of 7 is displayed on the multi-touch device. In this example the function being performed is the addition function. However this can be generalized to take in the input from one or more digits to perform a defined function.

A volume control of a radio with "0-9" representing volume levels could be changed by a user's fingers 102. In addition, a keyboard with this user interface 202 may be implemented with each letter assigned to a different digit identity and digit implementation.

Figure 3:
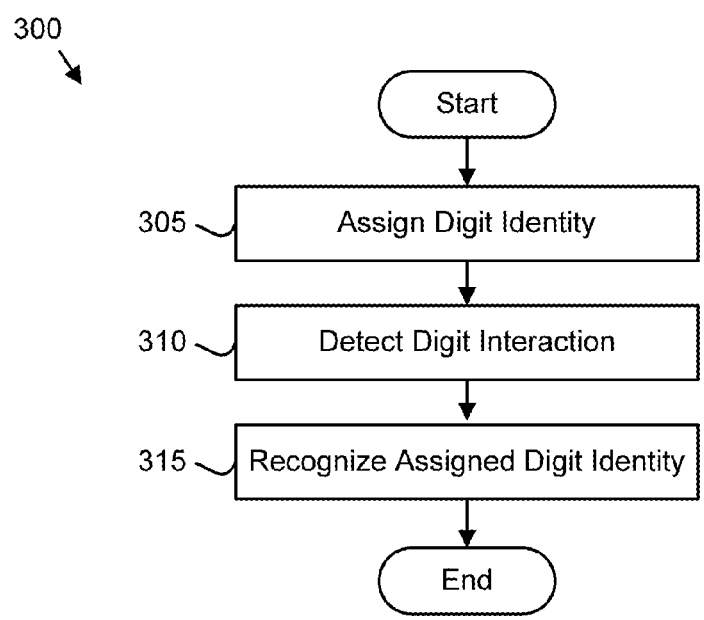
FIG. 3 is a schematic flow chart diagram illustrating one embodiment of a method for a multi-point touch-sensitive sensor user interface using distinct digit identification.

FIG. 3 is a schematic flow chart diagram illustrating one embodiment of a method 300 for a multi-point touch-sensitive sensor 101 user interface using distinct digit identification. The method 300 performs at least a portion of the functions of the apparatus 200 of FIG. 2. The description of the method 300 refers to elements of FIGS. 1-2, like numbers referring to like elements.

The method 300 starts and the assignment module 204 assigns 305 a digit identity to each digit of at least two digits in contact with a multi-point touch sensitive sensor 101 during a learning phase. The digit identity may include a distinct representation of each digit. The receiving module 208 detects 310 a digit interaction of one or more particular digits of the at least two digits with the multi-point touch-sensitive sensor 101. The determination module 210 recognizes 315 the assigned digit identity for each particular digit involved in the digit interaction and the method 300 ends.

Figure 4:
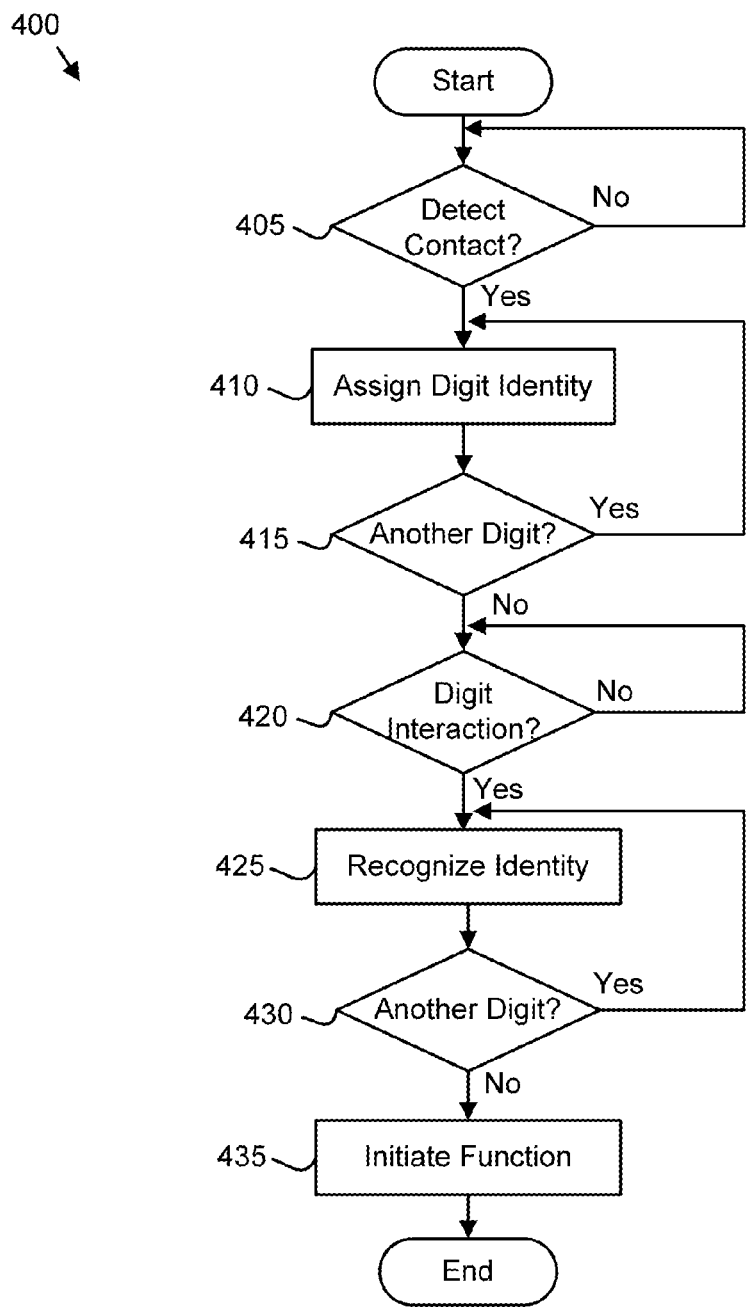
FIG. 4 is a schematic flow chart diagram illustrating another embodiment of a method for a multi-point touch-sensitive sensor user interface using distinct digit identification.

FIG. 4 is a schematic flow chart diagram illustrating another embodiment of a method 400 for a multi-point touch-sensitive sensor 101 user interface using distinct digit identification. The method 400 performs at least a portion of the functions of the apparatus 200 of FIG. 2. The description of the method 400 refers to elements of FIGS. 1-2, like numbers referring to like elements.

The method 400 starts and the assignment module 204 monitors for contact from two or more digits on a multi-point touch sensitive sensor 101. If the assignment module 204 does not detect 405 contact from two or more digits, the assignment module 204 may continue to monitor for contact from two or more digits. If the assignment module 204 detects 405 contact from two or more digits, the assignment module 204 assigns 410 a digit identity to a particular digit of the two or more digits. If the assignment module 204 determines that an additional digit has yet to be assigned a digit identity, the assignment module 204 assigns 410 a digit identity to the additional digit. The assignment module 204 may assign a digit identity to each of the two or more digits from the detected contact with the sensor 101. If the assignment module 204 determines 415 that no additional digits of the two or more digits have yet to be assigned a digit identity, the receiving module 208 monitors for a digit interaction of one or more digits of the two or more digits.

If the receiving module 208 does not detect 420 a digit interaction, the receiving module 208 continues to monitor for a digit interaction. If the receiving module 208 detects 420 a digit interaction of the one or more digits with the sensor 101, the determination module 210 recognizes 425 an assigned digit identity for a particular digit involved in the digit interaction. If the determination module 210 determines 430 that there is an additional digit involved in the digit interaction, the determination module 210 recognizes 425 an assigned digit identity for the additional digit. In one embodiment, the determination module 210 recognizes assigned digit identities for each digit involved in the digit interaction.

If the determination module 210 determines 430 that each digit from the digit interaction has been assigned a digit identity, the initiation module 212 initiates 435 a function based on the recognized assigned digit identities. Then the method 400 ends.

Figure 5:
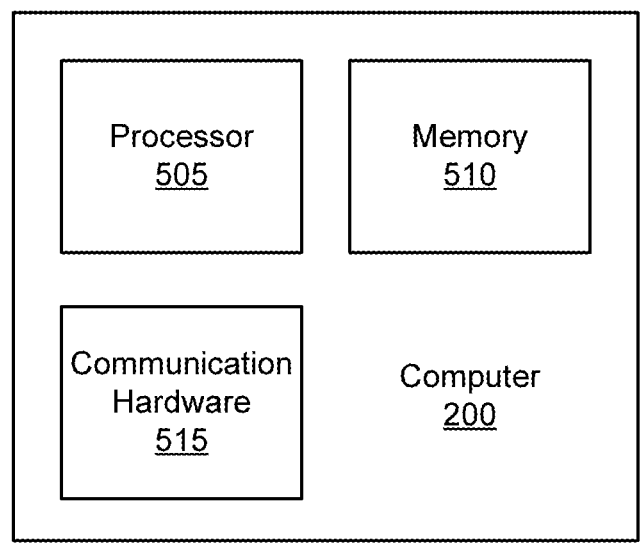
FIG. 5 is a schematic block diagram illustrating one embodiment of a computing system.

FIG. 5 is a schematic block diagram illustrating one embodiment of a computing system 200. In the depicted embodiment, the computing system 200 includes a processor 505, a memory 510, and communication hardware 515. The memory 510 may store machine-readable code. The memory 510 may be a semiconductor storage device, a hard disk drive, and optical storage device, and/or combinations thereof. The processor 505 may execute the machine-readable code. In certain embodiments, all or a portion of the digit identification apparatus described above may be stored on machine-readable code and executed by the processor. The computing system 500 may communicate with other devices through the communication hardware 515.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a non-transitory computer readable storage medium storing computer readable program code executable by a processor, the computer readable program code comprising:
an assignment module assigning a digit identity to each digit of a hand, in contact with a multi-point touch sensitive sensor during a learning phase based on determining for each digit a number of digits in a group of zero or more digits located to one side of the digit, and determining comparative pressures for each digit during the learning phase, wherein the comparative pressures compare pressures of each digit on the multi-point touch sensitive sensor with each other digit; and
a determination module recognizing the assigned digit identity for each particular digit from a comparative pressure digit interaction with the multi-point touch sensitive sensor.

2. The apparatus of claim 1, the computer readable program code further comprising an initiation module initiating a function in response to the determination module recognizing the assigned digit identity.

3. The apparatus of claim 1, the computer readable program code further comprising an initiation module initiating a function in response to a combination of each recognized assigned digit identity and a characteristic of the comparative pressure digit interaction.

4. The apparatus of claim 1, the determination module detecting a predetermined pattern of a plurality of comparative pressure digit interactions, each comparative pressure digit interaction having one or more particular digit comparative pressures, the computer readable program code further comprising an initiation module initiating a function in response to the determination module detecting the predetermined pattern.

5. The apparatus of claim 1, wherein each digit is assigned an alphanumeric value.

6. The apparatus of claim 1, wherein the determination module recognizes the assigned digit identity for each digit by the comparative pressure digit interaction between two or more digits.

7. The apparatus of claim 1, wherein the determination module recognizes the assigned digit identity for each digit by one or more of an amount of comparative pressure applied by two or more digits and a size of a contact point of the digit.

8. The apparatus of claim 1, wherein the determination module further recognizes the assigned digit identity for each digit by a relative position of a digit contact point to other digit contact points.

9. A method for digit identification for a multi-point touch sensitive sensor, the method comprising:
assigning, by use of a processor, a digit identity to each digit of a hand, in contact with a multi-point touch sensitive sensor during a learning phase based on determining for each digit a number of digits in a group of zero or more digits located to one side of the digit;
determining comparative pressures for each digit during the learning phase, wherein the comparative pressures compare pressures of each digit on the multi-point touch sensitive sensor with each other digit; and
recognizing the assigned digit identity for each particular digit from a comparative pressure digit interaction with the multi-point touch sensitive sensor.

10. The method of claim 9, further comprising:
detecting a predetermined pattern of a plurality of comparative pressure digit interactions, each comparative pressure digit interaction having one or more particular digit comparative pressures; and
initiating a function in response to detecting the predetermined pattern.

11. The method of claim 9, further comprising initiating a function in response to a combination of each recognized assigned digit identity and a characteristic of the comparative pressure digit interaction.

12. The method of claim 9, further comprising recognizing the assigned digit identity for each digit by a relative position of a digit contact point to other digit contact points.

13. The method of claim 9, further comprising recognizing the assigned digit identity for each digit by a contact area of the digit.

14. The method of claim 9, further comprising recognizing the assigned digit identity for each digit by a distance between the digits.

15. A non-transitory computer readable storage medium the non-transitory computer readable storage medium having computer readable program code embodied therein, the computer readable program code configured to:
assign a digit identity to each digit of a hand, in contact with a multi-point touch sensitive sensor during a learning phase based on determining for each digit a number of digits in a group of zero or more digits located to one side of the digit;
determine comparative pressures for each digit during the learning phase, wherein the comparative pressures compare pressures of each digit on the multi-point touch sensitive sensor with each other digit; and
recognize the assigned digit identity for each particular digit from a comparative pressure digit interaction with the multi-point touch sensitive sensor.

16. The non-transitory computer readable storage medium of claim 15, the computer readable program code further;
detecting a predetermined pattern of a plurality of comparative pressure digit interactions, each comparative pressure digit interaction having one or more particular digit comparative pressures; and initiating a function in response to detecting the predetermined pattern.

17. The non-transitory computer readable storage medium of claim 15, the computer readable program code further initiating a function in response to a combination of each recognized assigned digit identity and a characteristic of the comparative pressure digit interaction.

18. The non-transitory computer readable storage medium of claim 15, the computer readable program code further recognizing the assigned digit identity for each digit using a plurality of digit characteristics.

19. A method for deploying a non-transitory computer program product comprising integrating computer readable program code into a non-transitory computer readable storage medium of a computing system, wherein the code in combination with the computing system performs the following:

assigning a digit identity to each digit of a hand, in contact with a multi-point touch sensitive sensor during a learning phase based on determining for each digit a number of digits in a group of zero or more digits located to one side of the digit;

determining comparative pressures for each digit during the learning phase, wherein the comparative pressures compare pressures of each digit on the multi-point touch sensitive sensor with each other digit; and recognizing the assigned digit identity for each particular digit from a comparative pressure digit interaction with the multi-point touch sensitive sensor.

20. The method of claim 19, the method further comprising;

detecting a predetermined pattern of a plurality of comparative pressure digit interactions, each comparative pressure digit interaction having one or more particular digit comparative pressures; and initiating a function in response to detecting the predetermined pattern.

* * * * *